Figure 1:
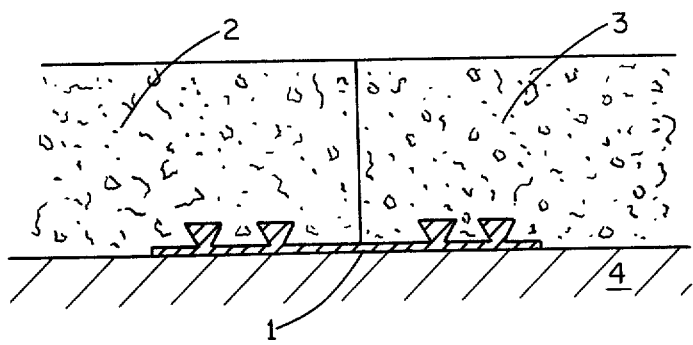

United States Patent [19] [11] 3,891,732
Hurst [45] June 24, 1975

[54] METHOD OF SEALING SHUTTERING AGAINST A DEFORMABLE SECTION OF AN EXTERNAL WATERSTOP FOR USE IN FORMING JOINTS IN CONCRETE

[75] Inventor: John Hurst, London, England

[73] Assignee: W. R. Grace & Company, Cambridge, Mass.

[22] Filed: Jan. 9, 1974

[21] Appl. No.: 431,808

Related U.S. Application Data

[60] Division of Ser. No. 328,994, Feb. 1, 1973, Pat. No. 3,808,762, which is a division of Ser. No. 217,676, Jan. 13, 1972, Pat. No. 3,758,650, which is a continuation of Ser. No. 4,379, Jan. 20, 1970, abandoned.

[30] Foreign Application Priority Data

Jan. 22, 1969 United Kingdom................ 3699/69

[52] U.S. Cl. .................. 264/34; 52/393; 52/396; 52/403; 52/464; 52/470; 52/471; 52/573; 264/35; 264/252; 264/254; 264/274
[51] Int. Cl. .............................................. E04b 1/16
[58] Field of Search ............ 52/393, 396, 403, 464, 52/470, 471, 573, 577; 264/35, 34, 250, 251, 252, 254, 256, 274, 275, 316

[56] References Cited
UNITED STATES PATENTS
3,099,110  7/1963  Spaight ............................. 52/403 X
3,128,576  4/1964  Bradley ............................ 52/396
3,172,237  3/1965  Bradley ............................ 52/396 X
3,583,120  6/1971  Wangerow ....................... 52/403 X FOREIGN PATENTS OR APPLICATIONS
1,103,115  2/1968  United Kingdom.................. 52/396
609,789  11/1960  Canada................................. 52/396

Primary Examiner—Robert F. White
Assistant Examiner—Thomas P. Pavelko
Attorney, Agent, or Firm—William L. Baker; C. E. Parker

[57] ABSTRACT

Method of forming joints between cast concrete sections using an external waterstop where the waterstop is provided with an easily deformable foamed portion having a plurality of closed cells more easily deformable than the remainder of said waterstop. Stop end shuttering is placed against said foamed portion whereby said foamed portion is deformed by the pressure of said stop end shuttering and conforms tightly in sealing relationship to the configuration of said shuttering thereby preventing seepage of the cast concrete under said stop end shuttering.

3 Claims, 1 Drawing Figure

PATENTED JUN 24 1975  3,891,732

METHOD OF SEALING SHUTTERING AGAINST A DEFORMABLE SECTION OF AN EXTERNAL WATERSTOP FOR USE IN FORMING JOINTS IN CONCRETE

This application is a division of application Ser. No. 328,994, filed Feb. 1, 1973 now U.S. Pat. No. 3,808,762, which is a division of application Ser. No. 217,676, filed Jan. 13, 1972, now U.S. Pat. No. 3,758,650, which is a continuation of application Ser. No. 4379 filed Jan. 20, 1970, now abandoned.

This invention relates to novel external waterstops and their use in sealing concrete joints, particularly such joints below ground level.

Over recent years the conventional centrally-placed dumbell-shaped waterstops for concrete joints have been increasingly replaced by external waterstops of the type described in our British Pat. Nos. 1,008,811 and 1,008,812, which offer substantial advantages in ease of installation and in effectiveness when installed.

Our British Pat. Nos. 1,008,811 and 1,008,812, the disclosure of which is hereby incorporated by reference, disclose a novel form of waterstop which is described for use in the sealing of a concrete joint formed by two adjacent and separately poured masses of concrete, i.e., an expansion, contraction or construction joint. The waterstop is installed on the outside of the joint and is in the form of an extruded or moulded section of rubber or other moisture and water-resistant flexible plastics material (e.g., polyvinyl chloride), the extruded or moulded section comprising a strip-like body having at least one formation broadening out from its root for keying into concrete projecting laterally from the waterstop on each side of the centre line thereof, the keying formations all projecting from the same face of the waterstop. The waterstop is such that outside each of the two keying formations nearest the centre line of the waterstop there is a portion of the waterstop through which nails may be driven to secure the waterstop to shuttering; this is most conveniently achieved by having a flange outside each of the, or the outermost, keying formations on either side of the centre line but even without such a flange, such a portion is present in any waterstop having at least two keying formations on either side of the centre line. The said waterstop is positioned with the keying formations of the waterstop embedded in the concrete whilst the outer face of the waterstop is not embedded in concrete, so that the joint falls between the two keying formations nearest the centre line of the waterstop.

The term "keying formation broadening out from its root" is used herein, as it is in the said patents, to include any formation which will key satisfactorily into concrete and is broader at some point more remote from the strip-like body. For example the cross-section of the keying formation can be T-shaped or in the shape of an inverted truncated triangle. Generally, the keying formations will all be the same shape, but this is not necessary.

Figure 2:
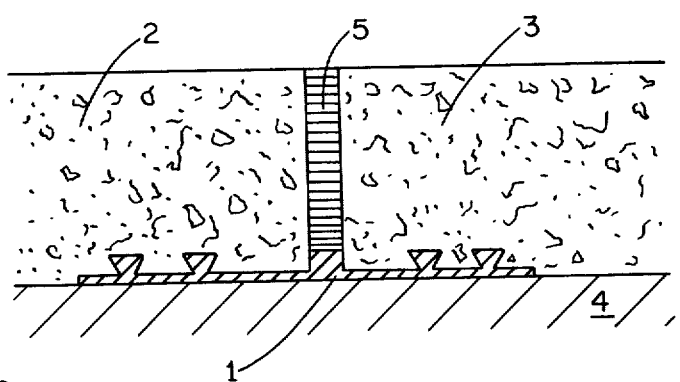

FIGS. 1 and 2 of the accompanying drawings show diagrammatically in cross-section typical externally sealed concretes joints of the known type. In each FIGURE a waterstop 1 seals the joint between the two masses of concrete 2 and 3 lying on a base of blinding concrete 4. FIG. 1 is of course a construction or contraction joint, while FIG. 2 is an expansion joint, for which the waterstop preferably has a rigid central hump 11 (which may be hollow) which fits into the small gap between the adjacent concrete masses which gap is filled with suitable expansion joint filler 5.

Figure 3:
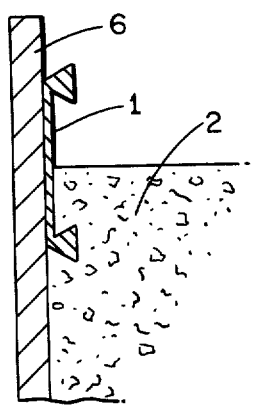
Figure 4:
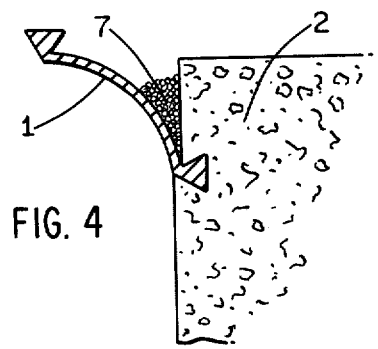

Although we have found that very much less satisfactory results are obtained, it is also possible in certain circumstances to use the inventive concept disclosed in the said patents by employing a less refined external waterstop in the form of a strip-like body having two keying formations only, these formations forming the edges of the strip. Such a waterstop can for example be used when it can be placed, before the concrete is poured, flat on a base, though we have found that inferior waterproofing results, presumably at least in part because there is only one keying formation embedded in the concrete on either side of the joint and there is no flange outside that keying formation. When such waterstops are used in other situations, still further disadvantages result. Thus firstly some means must be found to secure the waterstop against the shuttering; such securing means which have been proposed include the provision of clips which are fitted over the keying formations at intervals and provide lugs through which nails can be driven, which is of course very inconvenient; and the driving of nails through the keying formations themselves, which results in a still further reduction in the efficiency of the waterstop. Secondly, when the shuttering erected for the first mass of concrete is removed (after the first mass of concrete has been poured and has hardened), in order to erect the shuttering for the second mass of concrete, the waterstop is kept in place only by a single keying formation embedded in the first mass of concrete. Since that keying formation is, in this less refined form of external waterstop, necessarily at a distance of several inches from the centre line, the waterstop tends to fold away from the concrete, leaving a gap into which loose aggregate, dirt etc. very easily falls. When the waterstop is restored to the correct position by the erection of the shuttering for the second mass of concrete, such aggregate, dirt etc. is trapped and by providing a waterpath prevents proper sealing of the joint. This is diagrammatically illustrated in FIGS. 3 and 4 of the accompanying drawings; in FIG. 3 a waterstop 1 is fixed (by means not shown) to shuttering 6 while the first mass of concrete 2 is poured. When the shuttering 6 is removed, the waterstop folds away from the concrete as shown in FIG. 4, allowing aggregate, dirt etc. 7 to fall between the waterstop 1 and the concrete 2. When the waterstop is restored to the vertical position by shuttering erected for the second mass of concrete, the aggregate, dirt etc. 7 become trapped.

Though to a lesser extent, this problem of the folding away of the waterstop arises also with waterstops having only one keying formation either side of the centre line of the waterstop and a flange outboard of the keying formation, and even with waterstops having two or more keying formations either side of the centre line, though with the latter type the innermost keying formation can be very much nearer the centre line of the waterstop and there is consequently less danger of the waterstop folding away.

Figure 5:
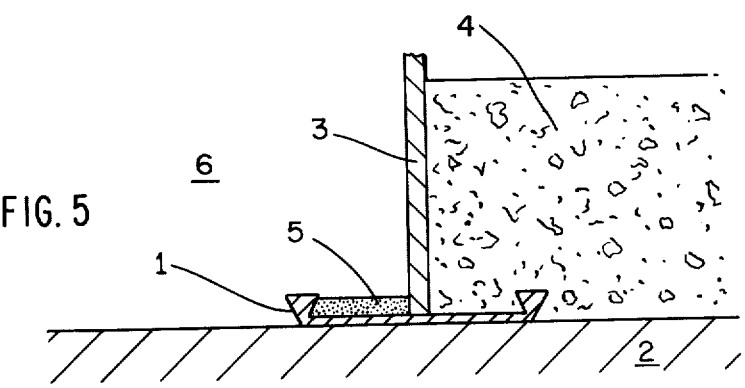

Problems have sometimes arisen in the past when installing external waterstops as a result of grout seeping underneath the stop-end shuttering during and immediately after the pouring of the first mass of concrete. "Stop-end shuttering" is shuttering placed against the central portion of the waterstop and at an angle (usually a right angle) thereto, to form the boundary of the first mass of concrete, against which the second mass of concrete is subsequently cast in order to form the joint. This is illustrated in FIG. 5 of the accompanying drawings, which shows diagrammatically in cross-section a base of blinding concrete 2 having placed thereon a waterstop 1 along the line of the proposed joint, with stop-end shuttering 3 in position in the gap between the two keying projections, to form a bay into which concrete 4 has been poured to form the first half of the joint. During and immediately after the pouring of the first mass of concrete there is a tendency for grout (i.e. an aqueous slurry of cement and very fine aggregate) to seep under the stop-end shuttering and collect in (and in some cases even fill) the trough formed between the stop-end shuttering and the exposed keying formation, as shown at 5. We have found that if this happens, the water-proofing of the joint is seriously prejudiced unless the grout is subsequently removed from the trough (which is extremely inconvenient and difficult), because when the second mass of concrete is poured into the space 6 (after removal of the stop-end shuttering), it does not key satisfactorily to the (or the innermost) keying formation of the waterstop. In addition, seepage of the grout under the stop-end shuttering bleeds the cement content from the concrete of the first pour immediately adjacent to the base of the shuttering, with the result that the concrete at this critical point in the joint is of a porous or otherwise unsatisfactory character. It will be appreciated that this problem is particularly serious in the case of waterstops having only one keying formation each side of the centre line, since when using waterstops having two (or more) keying formations each side of the centre line, there remains at least one keying formation whose efficiency is not impaired by grout seepage. Furthermore, removal of the stop-end shuttering is made more difficult by grout seepage, if the grout is allowed to harden in the trough 5.

We have now discovered that improved results can be obtained by using an external water-stop (either as described in our British Pat. Nos. 1,008,811 and 1,008,812 or the less refined waterstops described above) having a deformable central section which, when stop-end shuttering is placed against it, will deform (preferably, to some extent at least, elastically) to give a grout-tight seal between the stop-end shuttering and the waterstop, even when the shuttering has an irregular edge and/or the waterstop does not lie exactly in one plane, as for example when it lies on an undulating surface. By this means the problems arising from grout seepage can be completely overcome in all normal situations. This is an important practical improvement. Although for general use waterstops having two or more pairs of keying formations are preferred, it is to be noted that the present invention makes it possible for the first time to employ an external waterstop having only one pair of keying formations and obtain reliable results in those situations where falling away of the waterstop after the first pour of concrete (as already described) is not a problem; this is of course primarily where the waterstop is laid flat on a base.

The present invention provides in its first aspect a waterstop in the form of an extruded or moulded section of rubber or other moisture and water-resistant flexible plastics material, e.g. polyvinyl chloride, the extruded or moulded section comprising a strip-like body having (A) at least one formation, which broadens out from its root for keying into concrete, projecting laterally from the strip-like body on each side of the centre line thereof, the keying formations all projecting from the same face of the strip-like body and running longitudinally along the length thereof and (b) a deformable central section projecting from the same face of the strip-like body as the keying formations and running longitudinally along the length thereof between the two keying formations or, when there are more than two keying formations, between the two keying formations adjacent the centre line of the strip-like body.

In a second aspect the invention provides a method of producing a concrete joint formed by two adjacent and separately poured masses of concrete and having a water seal at a face thereof which method comprises:
1. placing a waterstop as defined above in position against a concrete base and/or against shuttering;
2. placing stop-end shuttering against the deformable central section to the waterstop to form a grout-tight seal between the shuttering and the waterstop;
3. pouring the first mass of concrete so that the or each keying formation on one side of the centre line of the waterstop becomes embedded in the concrete; and
4. pouring the second mass of concrete so that the exposed keying formation or formations of the waterstop become embedded therein. Step (4) is of course carried out after the first mass of concrete has hardened and the stop-end shuttering has been removed.

In a third aspect the invention provides a concrete joint formed by two adjacent and separately poured masses of concrete and having at a face thereof a waterstop as defined above, the waterstop being positioned with the keying formations embedded in the respective masses of concrete whilst the outer face of the waterstop is not embedded in the concrete.

The deformable central section is preferably formed integrally with the remainder of the waterstop, both for ease of manufacture (e.g., by extrusion through a suitable die) and convenience in use, but may be added to a conventional waterstop, e.g., by means of an adhesive, either before installation or after the waterstop has been placed in position but before the shuttering is placed in position.

It should be understood that in referring to the waterstops as having a deformable central section, we do not exclude the possibility that a limited area either side of the centre line is flat and not deformable; indeed this may be preferred in order to show clearly where the centre of the waterstop is. All that is necessary is that when the stop-end shuttering contacts the waterstop it does so at the, or part of the, deformable section and thus ensures a grout-tight seal.

The deformable central section comprises a section raised above the main body of the waterstop and having a void, or preferably, a plurality of voids, therein. Such void or voids can run the length of the waterstop or a plurality of closed cells can be present, as for example in a foamed structure.

The width of the deformable central section must be sufficient to ensure a grout-tight seal under the shuttering, and for this reason it will usually be at least ½ inch (1.27 cm.), preferably at least ¾ inch (1.9 cm.), especially at least 1 inch (2.54 cm.), wide. The deformable cross-section can extend across the full width of the waterstop between the two, or two innermost, keying formations, but will not generally do so; thus a width of not more than about 3 or 4 inches (7.5 to 10 cm.) is usually preferred. In general, a width of 1 to 2 inches (2.5 to 5.0 cm.) e.g. about 1¼ inches (3.2 cm.), is satisfactory.

The present invention is applicable not only to external waterstops designed for use in contraction and construction joints, which have an essentially flat central section, but also to external waterstops designed for use in expansion joints, which usually have a rigid central arch (which may be solid or hollow and may for example be of rectangular or hemispheric cross-section) which fits into the small gap between the adjacent concrete masses forming the joint. In the latter case at least part of the deformable central section is usually placed on the top of the arch, since this is the point at which the stop-end shuttering usually contacts the waterstops.

Figure 6:
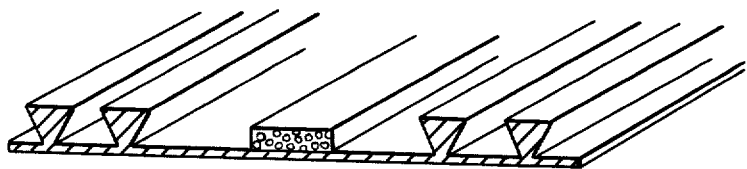

A cross-section of a typical novel waterstop of the invention is shown in diagrammatic form in FIG. 6 of the accompanying drawings. The width of the waterstop is typically 8 to 12 inches.

It is claimed:

1. The method of forming a water-impervious seal at a concrete joint formed by two adjacent and separately poured masses of concrete, said method comprising the steps of:
    1. providing a strip of moisture or water-resistant flexible material not sufficiently deformable by shuttering placed thereon to effect a grout-tight seal therewith, said strip having a longitudinally extending center line, and at least one keying formation projecting laterally from said strip on each side of the center line thereof, said keying formations all projecting from the same face of said strip and running longitudinally along the length thereof, said keying formations being structured such that the formations broaden out from the point at which they project from said strip, said strip further having substantially at said center line a raised, foam portion having a plurality of closed cells more easily deformable than said strip and running longitudinally along the length of said strip and projecting laterally from the same surface as said keying formations; said foam portion being sufficiently deformable by shuttering placed thereon to effect a grout-tight seal therewith;
    2. placing the surface of said strip which is opposite to the surface from which said formations project against a base or shuttering, on or against which base or shuttering said concrete masses are to be poured;
    3. placing stop-end shuttering against said deformable section of said strip whereby said section is deformed by the pressure of said stop-end shuttering and conform tightly in sealing relationship to the configuration of said shuttering;
    4. pouring a first mass of concrete so that the or each keying formation on one side of the center line of said strip becomes embedded in the concrete; removing said shuttering; and
    5. pouring a second mass of concrete so that the exposed keying formation or formations on the opposite side of said center line of said strip becomes embedded therein.

2. The method of claim 1 wherein the width of the deformable section is 1–2 inches.

3. The method of claim 1 wherein there is employed at least two pairs of said keying formations, one pair being positioned on one side of said center line the remaining pair being positioned on the other side of said center line, the two outermost keying formations being spaced inwardly from the edges of said strip.

* * * * *